Figure 1:
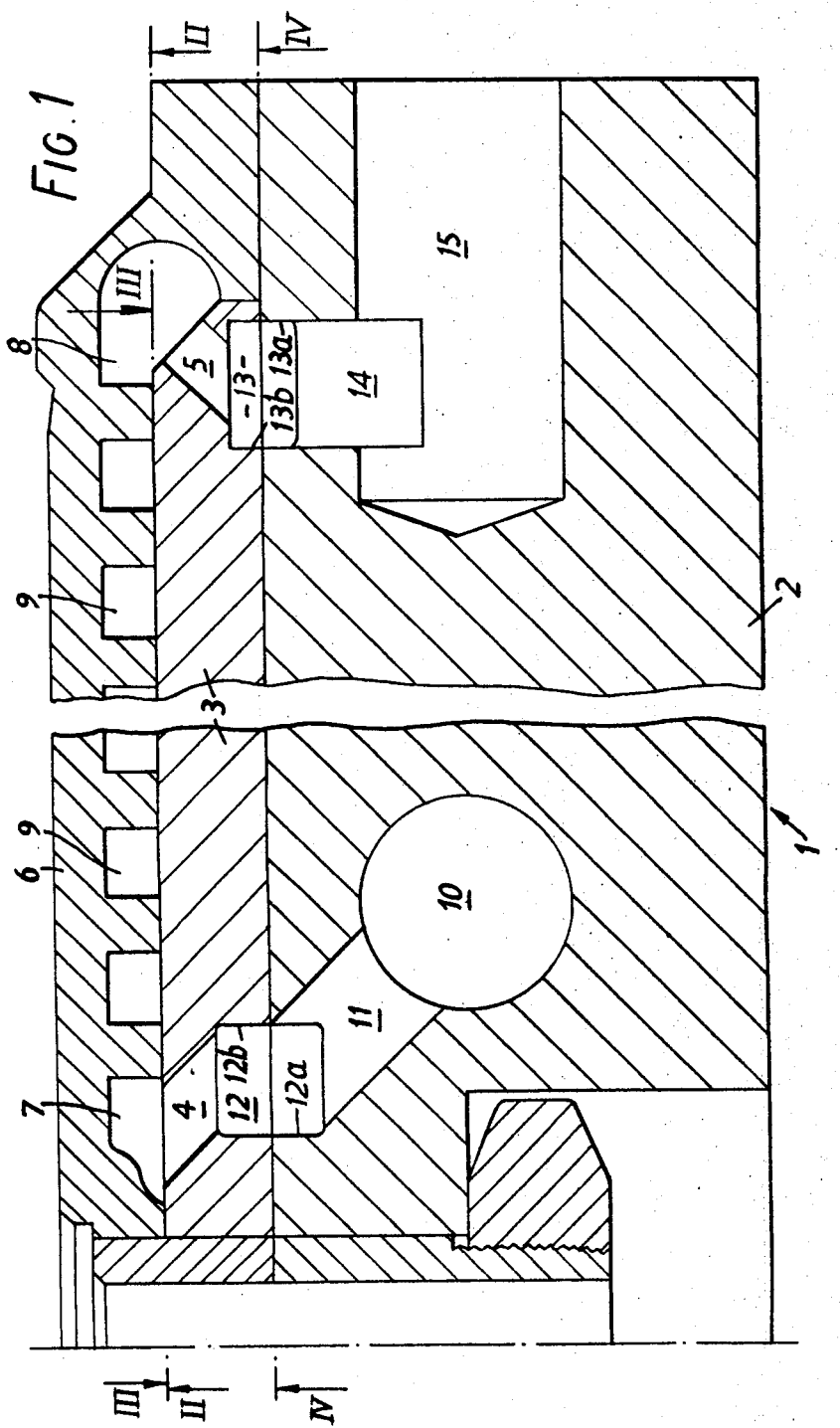

United States Patent [19]
Strausfeld

[11] 3,830,459
[45] Aug. 20, 1974

[54] RECORD PRESSES

[75] Inventor: Hermann Strausfeld, Cologne, Germany

[73] Assignee: EMI Electrola Gesellschaft Mit Beschrankter Haftung, Cologne-Braunsfeld, Germany

[22] Filed: June 26, 1973

[21] Appl. No.: 373,853

[30] Foreign Application Priority Data
June 28, 1972 Great Britain................... 30209/72

[52] U.S. Cl.................. 249/79, 425/810, 425/407
[51] Int. Cl. ..... B24c 17/00, B29c 3/00, B29d 17/00
[58] Field of Search ............ 425/39, 243, 109, 384, 425/407, 116, DIG. 810; 18/5.3, 17 H; 249/79

[56] References Cited
UNITED STATES PATENTS

| | | | |
|---|---|---|---|
| 483,653 | 10/1892 | Jefferson.................... | 425/384 X |
| 1,251,851 | 1/1918 | Wickes ..................... | 425/810 X |
| 1,290,105 | 1/1919 | Davenport................. | 425/810 X |
| 1,307,812 | 6/1919 | Errickson................... | 425/810 X |
| 1,442,856 | 1/1923 | Christensen ............... | 425/810 X |
| 1,504,422 | 8/1924 | Bishop ...................... | 425/810 X |
| 1,582,704 | 4/1926 | Sylvester et al............ | 425/407 |
| 2,828,509 | 4/1958 | Smucker et al............ | 425/243 |
| 3,224,040 | 12/1965 | Bridges et al.............. | 425/243 |
| R15,608 | 5/1923 | Burroughs.................. | 425/384 |

Primary Examiner—J. Howard Flint, Jr.
Attorney, Agent, or Firm—Fleit, Gipple & Jacobson

[57] ABSTRACT

A gramophone record press has mould blocks having a fluid circuit for heating and cooling fluids. The fluid circuit comprises an inner circular channel adjacent the centre of the mould block and an outer circular channel adjacent the periphery of the mould block, the two channels being connected by ducts arranged as a plurality of interlaced spirals. The channels are connected respectively to inlet and outlet manifolds by a plurality of passages angularly spaced around the respective channels. The two sets of passages have a circumferential component of inclination, so that fluid is fed into the inlet channel with substantially the same velocity and sense, and removed from the outlet channel in a similar manner.

9 Claims, 4 Drawing Figures

RECORD PRESSES

This invention relates to presses for modulated groove disc records.

In the production of a gramophone record, the mould blocks usually undergo a heating and cooling cycle. The heating cycle helps to ensure that the mouldable plastics material is soft enough to fill the fine grooves of the sound track, while the cooling cycle causes the softened plastics material to harden before the press is opened and the record removed. If the cooling cycle does not uniformly cool the record, thermal stresses can occur in the record and the record may be warped or dished and consequently have to be rejected. In known presses, the cooling cycle can be adversely affected by fluctuations in the pressure of the supply of cooling fluid.

The object of the present invention is to provide a press for modulated disc records with an improved fluid circuit for the circulation of heating and/or cooling fluid.

According to the invention there is provided in or for a press for modulated groove disc records, a mould block having a plurality of internal ducts for the passage of fluid through the block to influence the temperature thereof, said ducts extending between annular channels located one near the edge of the block and the other near the centre of the block, the ducts having respective entrances and exits angularly spaced around the respective channels, and means for feeding fluid to be passed through the ducts in to one of said channels at a plurality of inlets spaced angularly around said one channel, said inlets having a circumferential component of inclination with respect to said one channel whereby the fluid is injected at each inlet with substantially the same sense and velocity around said one channel.

Preferably the ducts are formed by a plurality of interlaced spirals extending from a central annular channel to an outer annular channel. The inlets may comprise a plurality of angularly spaced passages extending from an annular manifold to said inner channel, the passages being similarly inclined so that fluid is injected into the said inner channel with a substantial tangential component of velocity. Preferably another plurality of passages extend from said outer annular channel to another annular manifold, these passages being inclined in like manner but in opposite sense to the first mentioned passages. This allows either manifold to be used as the inlet and the other to be used as the outlet.

Figure 2:
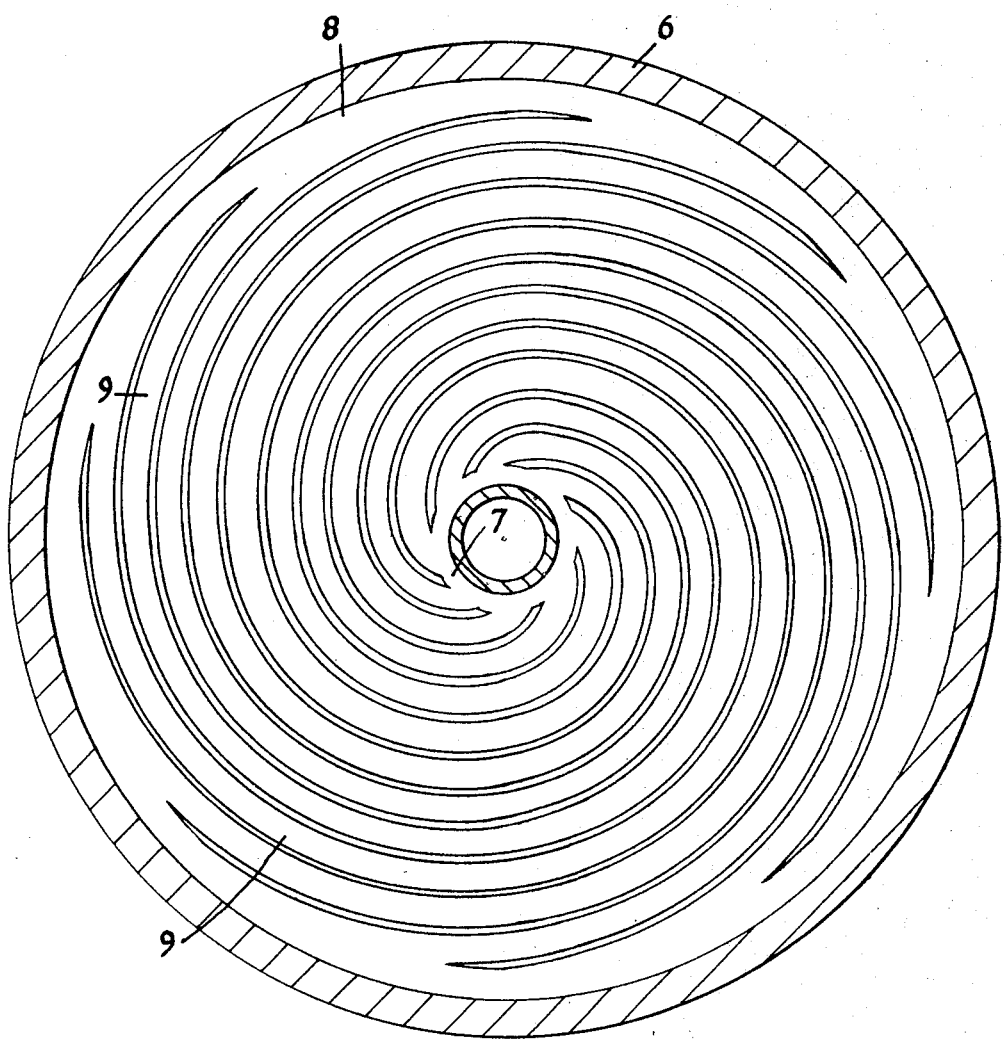
Figure 3:
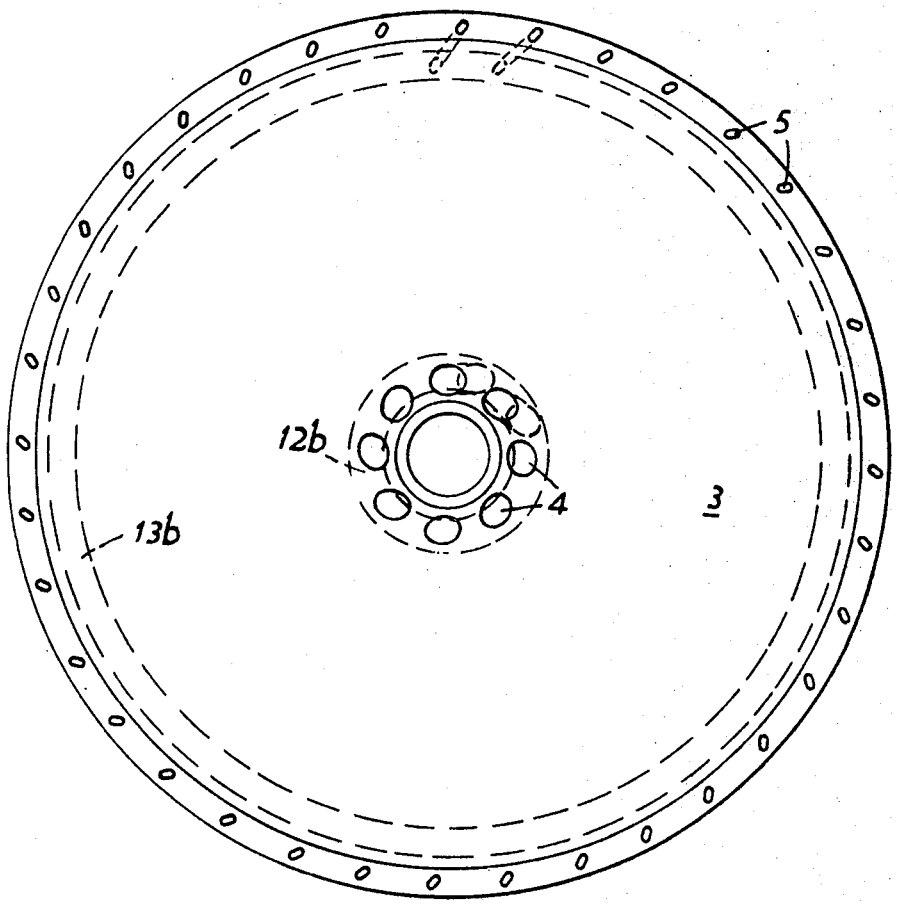
Figure 4:
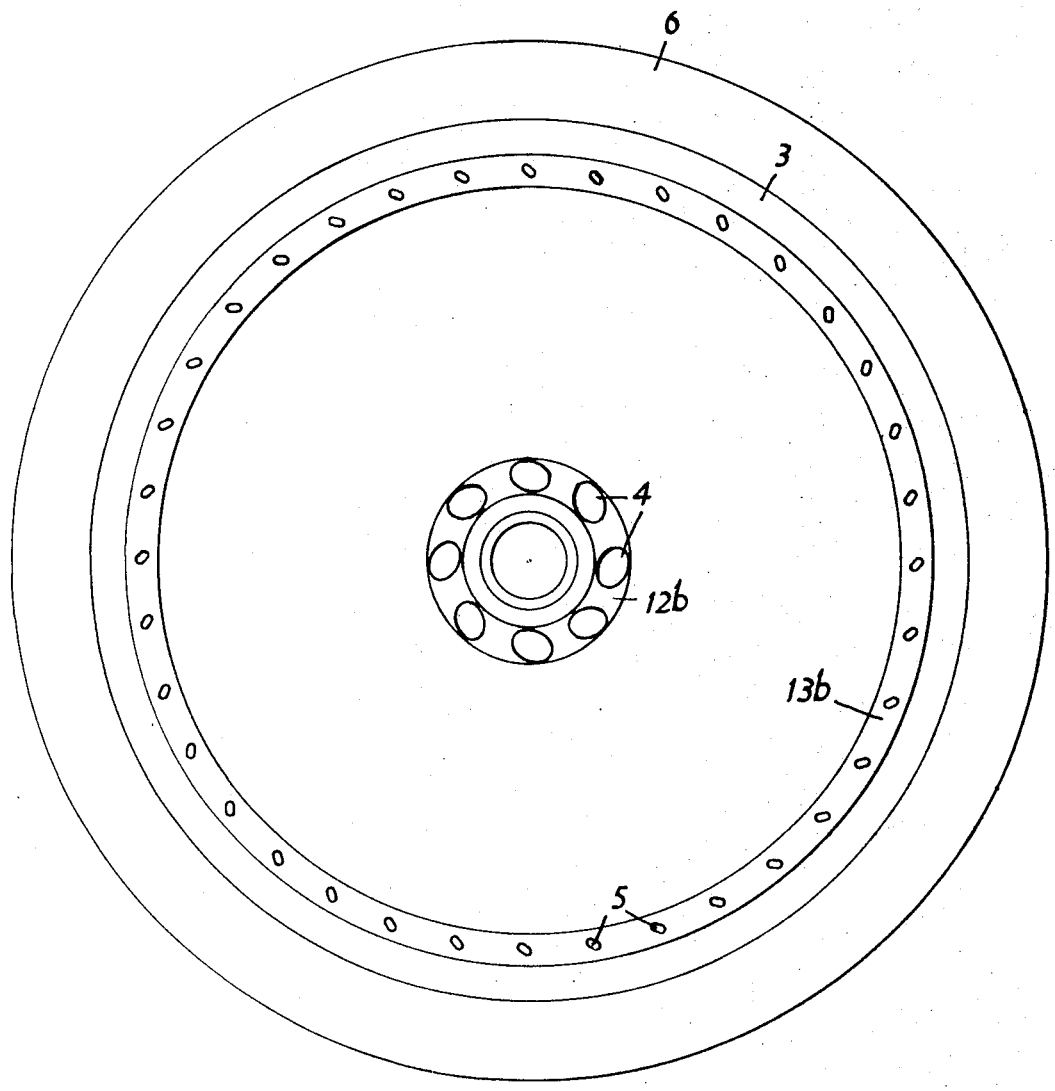

In order that the invention may be clearly understood and readily carried into effect it will now be described by way of example with reference to the accompanying drawings in which:

FIG. 1 illustrates diagrammatically a radial sectional view of one mould block of a gramophone record press in accordance with the invention, FIG. 2 illustrates diagrammatically a view in the direction II—II of FIG. 1 showing the internal ducts, FIG. 3 illustrates diagrammatically a view in the direction III—III of FIG. 1, and FIG. 4 illustrates diagrammatically a view in the direction IV—IV of FIG. 1.

Referring to the drawings, there is shown one mould block of a gramophone record press, it being understood that the other mould block will be provided with a fluid circuit similar to the one illustrated. In this example, the mould block 1 comprises three parts, namely a base plate 2, an intermediate plate 3 containing orientated inlets 4 and orientated outlets 5, and a front plate 6 containing annular channels 7 and 8 and ducts 9. The front surface of the front plate 6 will, in operation of the record press, be provided with a stamper disc for impressing the sound track on a gramophone record.

The base plate 2 is provided with a bore 10 for the supply of fluid, such as steam for heating and water for cooling the mould block 1, to the inlets 4. A bore 11 delivers the entering fluid to an annular manifold 12 to which all the inlets 4 are connected. The manifold 12 is formed by a channel 12a in the base plate 2 and a corresponding channel 12b in the intermediate plate 3. The outlets 5 deliver the fluid from the annular channel 8 to another annular manifold 13 which is formed by a channel 13a in the base plate 2 and a corresponding channel 13b in the intermediate plate 3. If desired, the manifolds 12 and 13 may be formed wholly in the base plate 2 or wholly in the intermediate plate 3.

The inlets 4 are inclined in the circumferential direction with respect to the annular channel 7, into which they deliver circulating fluid, as shown in FIG. 3 in the case of two of the inlets, and are angularly spaced around the channel 7. They are inclined in the same sense around the channel 7 so that fluid is injected therein with the same sense and velocity around the channel 7. Suitably the inclination may be 45° although other suitable inclinations may be employed. In this example there are shown eight inlets equally spaced around the channel 7, but other numbers of inlets can be employed.

As can also be seen in FIG. 3 (in the case of two of the outlets) the outlets 5 are also inclined circumferentially with respect to the annular channel 8 from which they conduct the outgoing fluid. The outlets 5 are inclined in the same sense around the channel 8, suitably at an angle of 45° although other inclinations may be employed. In this example, thirty six outlets are shown equally spaced around the channel 8 but a greater or lesser number of outlets can be employed.

The total cross-sectional area of the outlets 5 is substantially equal to the total cross-sectional area of the inlets 4. The inclination of the outlets 5, while in the opposite sense to the inclination of the inlets 4 (as can be seen in FIG. 3), is in the forward direction of the fluid flow. These two factors, together with the arrangement of the ducts 9 hereinafter described, allow the fluid to flow in an unimpeded manner around the fluid circuit and permit, should it be so desired, the fluid to be passed in the opposite direction around the fluid circuit with the same ease.

The fluid leaves the block through bores 14 and 15.

Preferably, as shown, the bore 10 through the base plate 2 is disposed substantially tangential to the annular manifold 12 and hence annular channel 7. The bores 11 and 14 may have a circumferential inclination in the same sense as the inlets 4 and the outlets 5 respectively.

The ducts 9, as shown in FIG. 2, comprise a plurality of interlaced spirals, in this example there being eight spirals. They may be formed as channels in the front plate 6 as shown in FIG. 1. Alternatively the ducts 9 and/or the annular channels 7 and 8 may be formed partly in the intermediate plate 3 and partly in the front plate 6, or they may be formed wholly in the intermediate plate 3. The entraces to the ducts 9 face in the upstream direction of flow of the fluid around the channel 7 whereby to provide an unimpeded flow of fluid into the ducts 9. The entraces to the outlets 5 face in the upstream direction of flow of the fluid in the annular channel 8.

By means of the invention, a more uniform cooling is obtained in the cooling cycle, and furthermore, this cooling is not so sensitive to fluctuations in the pressure of the supply of the cooling fluid as prior art systems. A more uniform heating is also obtained in the heating cycle, although this is not as critical as a uniform cooling cycle in both mould blocks.

The base plate 2, intermediate plate 3 and front plate 6 may be secured together by any suitable means such as by brazing or welding or by means of bolts. Preferably there are also employed sealing rings suitably disposed to provide a seal around the fluid circuit.

Preferably means are provided for introducing turbulence into the fluid flowing in the ducts 9. For example, grooves of small cross-sectional area may be provided in that face of intermediate plate 3 to which the front plate 6 is secured. These grooves traverse the ducts 9 obliquely from one side to the other and may suitably be circular. Alternatively the ducts 9 may vary in width and/or depth along their length or the ducts may undulate along their length as opposed to the smooth curves shown in FIG. 2. Any combination of these or other means may be employed to introduce turbulence into the fluid flowing in the ducts 9.

It will be appreciated that the invention is applicable to injection or compression moulding machines for producing gramophone records. Mould blocks in accordance with the invention may be fitted to any known press and are especially suitable for use in an automatic press. For example, the mould blocks may be included in the record press described in U.S. Pat. Specification Ser. No. 3,557,406.

What I claim is:

1. A press for modulated groove disc records comprising a mould block having a plurality of internal ducts for the passage of fluid through the block to influence the temperature thereof, said ducts extending between annular channels located one near the edge of the block and the other near the centre of the block, the ducts having respective entrances and exits angularly spaced around the respective channels, and means for feeding fluid to be passed through the ducts in to one of said channels at a plurality of inlets spaced angularly around said one channel, said inlets having a circumferential component of inclination with respect to said one channel whereby the fluid is injected at each inlet with substantially the same sense and velocity around said one channel.

2. A press in accordance with claim 1 in which said ducts comprise a plurality of interlaced spirals, the entrances to said spirals facing the upstream direction of fluid flow in said one channel.

3. A press in accordance with claim 1 in which said inlets comprise a plurality of passages extending from an annular inlet manifold to said one channel.

4. A press in accordance with claim 1 including a plurality of outlets angularly spaced around the other of said channels, said outlets having a circumferential component of inclination with respect to said other channel, the entrances of said outlets facing the upstream direction of fluid flow in said other channel.

5. A press in ccordance with claim 4 in which said outlets comprise a plurality of passages extending from said other channel to an annular outlet manifold.

6. A press in accordance with claim 1 in which said ducts are provided with means for producing turbulence in the fluid flowing therein.

7. A press in accordance with claim 6 in which said means for producing turbulence comprises fine grooves.

8. A press in accordance with claim 6 in which said means for producing turbulence comprises undulations in said ducts.

9. A press in accordance with claim 6 in which said means for producing turbulence comprises variations in the cross-sectional area of said ducts.

* * * * *